INVENTOR.
ABRAM HART

United States Patent Office 3,228,798
Patented Jan. 11, 1966

3,228,798
GAS ELECTRODE
Abram Hart, Havertown, Pa., assignor to The Electric Storage Battery Company, a corporation of New Jersey
Filed Apr. 12, 1962, Ser. No. 186,938
6 Claims. (Cl. 136—86)

The present invention generally relates to new and useful improvements in gas electrodes for the direct production of electrical energy from gases. More specifically, the present invention is concerned with plate type porous gas electrodes having a pair of oppositely disposed surfaces both of which are electrochemically active.

Devices for the direct production of electrical energy from chemical energy by electrochemical means are commonly known as fuel cells. One common form of fuel cell consists of a liquid electrolyte bath such as a potassium hydroxide solution with two porous gas electrodes immersed therein. An oxidizing gas such as oxygen or a halogen is fed to the cell through one of the porous gas electrodes, designated as the oxygen electrode, and a fuel gas such as hydrogen or a hydrocarbon gas is fed through the other porous gas electrode known as the fuel electrode. The porous surfaces of the gas electrodes provide active sites for the electrochemical reaction by which electricity is produced.

The efficiency of fuel cells depends to a large degree upon the catalytically active surface of the gas electrodes. Accordingly, it is desirable to utilize gas electrodes having a multiplicity of pores to provide electrodes having the largest available surface area. To this end it has heretofore been proposed to utilize porous bodies of sintered catalytically active metals such as silver, nickel, palladium, platinum, etc., or mixtures of these metals as gas electrodes for fuel cells. Such porous bodies may then if desired be further impregnated with catalytic materials to further enhance their efficiencies for electrode purposes. Design considerations also dictate that the electrode configuration employed be that which permits the most effective utilization of the available cell space. For most applications it has been found that this is best achieved by employing flat plate type electrodes which permit the stacking of the cell elements. In operation the oxidizing gas and the fuel gas is introduced under pressure through the pores of the respective electrodes from their hollow interiors or from behind the electrodes in counter-current opposition to the direction of electrolyte penetration. Accordingly, these electrodes must have sufficient physical strength to withstand the gas pressure applied thereto.

In the co-pending application of V. J. Spera et al., Serial No. 79,019, filed December 28, 1960, now abandoned and entitled "Gas Electrode and Method for Making the Same" there is described a porous sintered electrode which was characterized by having a pair of flat oppositely disposed catalytically active surfaces. The electrode comprises a porous sintered body of a suitable electrode material having a network of interconnected gas distribution channels centrally disposed between its flat surfaces. A plurality of bridges of sintered material integral with and connecting the flat electrode surfaces are provided to enable the electrode to withstand high internal gas pressures without cracking or rupturing of the sintered structure. While this type of electrode has proven satisfactory for most applications and constitutes a definite improvement over the prior art, it has been found that the length of the gas path from the gas channels to the electrode surfaces is not uniform over the entire surface area due to the strengthening bridges linking the electrode surfaces and consequently gas diffusion to the electrode surface is non-uniform. In addition, such electrodes are not adapted for production by continuous processes.

It is an object of the present invention to provide a new and improved electrode of the type described characterized by high mechanical strength and uniform wall thickness, thereby providing even more uniform gas diffusion and current densities over the electrode surface.

Another object of the present invention is to provide a new and improved plate type electrode which is adapted for continuous manufacture.

In accordance with the present invention, there is provided a plate type gas electrode for fuel cells comprising a porous sintered body of catalytically active metal having a pair of oppositely disposed porous surfaces. The electrode has a plurality of parallel gas channels centrally disposed between its surfaces, the channels extending the length of the electrode. The surfaces of the electrode are corrugated in such a manner as to conform to the geometric configuration of the gas channels thereby providing an electrode with substantially equal wall thicknesses between the electrode surfaces and the gas channels. As a result, the electrode is characterized by substantially uniform gas diffusion over the entire surface. Manifolding means are employed to interconnect the gas channels at one end of the electrode to feed gas to the channels. The gas channels at the other end of the electrode may be sealed to prevent loss of gas therefrom or provided with an exit manifold for interconnection with other electrodes of a fuel cell system.

A better understanding of the present invention may be had from the following description when read with reference to the accompanying drawings of which:

Figure 1:
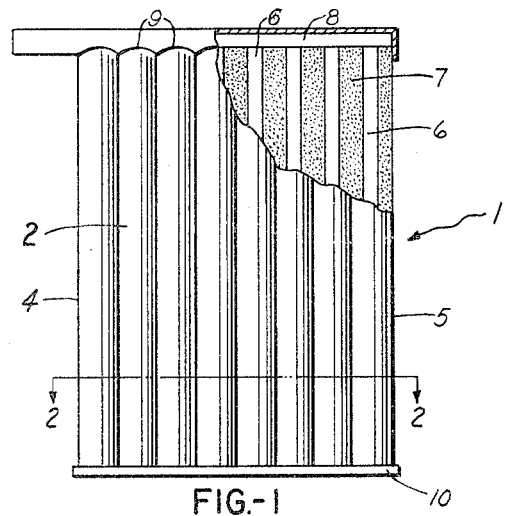
FIG. 1 is a front elevation of an electrode in accordance with the present invention shown partially cut away to illustrate the gas channel structure in the interior of the electrode.
Figure 2:
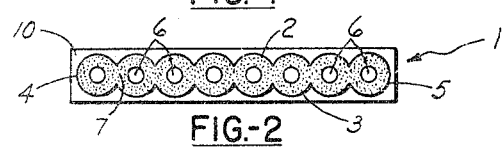
FIG. 2 is a cross-sectional view of the electrode shown in FIG. 1 taken along the line 2—2.

Referring now to FIGS. 1 and 2, the numeral 1 designates an electrode in accordance with the present invention which comprises a plate-like body of finely divided catalytically active material which has been structuralized by sintering. As shown, the electrode is shaped to provide two oppositely disposed electrochemically active surfaces 2 and 3. It should be understood, however, that while the electrode is primarily designed to provide greater surface area at its surfaces 2 and 3, it does not eliminate or reduce activity at the sides 4 and 5 of the electrodes. The numeral 6 designates a plurality of parallel gas channels centrally disposed between the surfaces 2 and 3 which run the length of the electrodes. The surfaces 2 and 3 of the electrode 1 are corrugated to substantially conform to the geometric configuration of the gas channels 6, thereby providing the electrode with substantially equal wall thickness between the gas channels and the electrode surface. To enable the electrode to withstand high internal gas pressures without rupturing, the depth of the corrugations are made such that bridges 7 of porous sintered material remain between the parallel gas passages 6. Inasmuch as the wall thickness between the gas channels 6 and the surfaces 2 and 3 is substantially equal in all directions, there is provided a catalyst, gas, electrolyte interface which is substantially uniform over the surface of the electrode, thereby providing substantially equal current density across the electrode surface.

In order to feed gas to the gas channel 6, a gas manifold 8 is connected across the top of the sintered electrode structure and, as shown, may conveniently be in the form of a tube perforated to fit over the end of the sintered body and made of a metal inert in electrolyte in which the electrode is to be used. In this respect for alkaline electrolytes, nickel has been found to be a suitable material for the manifold 8. For acid electrolytes, certain stainless steels have been found to be applicable. The manifold 8 may be affixed to and sealed to the electrode 1 by means of a suitable sealant such as an epoxy resin applied at the juncture 9. As shown, the other end of the electrode 1 may be sealed to prevent loss of gas through the ends of the gas channels 6 and this may be accomplished by potting the lower end of the electrode in a suitable casting resin as indicated by the numeral 10. It should be understood, however, that where it is desirable to circulate the gas passing through the gas channel 6 to another electrode that a manifold arrangement similar to the gas manifold 8 may be utilized instead of the seal 10. Such an arrangement has been shown in connection with the electrode shown in FIG. 3. If the manifold 8 is made of a metal such as nickel, it may also serve as the electrical terminal for the electrode. However, as will be understood by those skilled in the art, another form of electrical connection may be made to the electrode.

Figure 3:
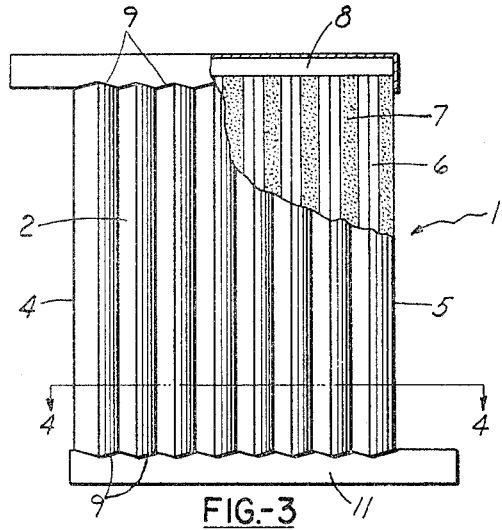
FIG. 3 is a front elevation of a modification of the electrode shown in FIG. 1 which is also illustrated partially cut away.
Figure 4:
FIG. 4 is a cross-sectional view of the electrode shown in FIG. 3 taken along the line 4—4.

Referring now to FIGS. 3 and 4 there is shown a modification of the electrode shown in FIGS. 2 and 3. Similar reference characters have been used to designate components and features similar to those shown in FIGS. 2 and 3 and for simplicity the functional description of these similar components and features will not be repeated. The gas passages 6 in this electrode have a square cross-section and, accordingly, unlike the electrodes shown in FIGS. 2 and 3 which have curved corrugations, corrugations in the surface of the electrodes shown in FIGS. 3 and 4 are angular providing that electrode with a stepped or sawtoothed profile. Once again, by means of this construction the electrode has substantially equal wall thickness between the surfaces of the electrode and the gas channels. The electrode of FIGS. 3 and 4 also differs from the electrode shown in FIGS. 1 and 2 in that instead of the gas passages 6 being sealed by means of a potting compound 10, a second gas manifold 11 is provided to circulate the gas exhausted therefrom to other electrodes of the fuel cell system. Again, the juncture 9 of the manifold 11 and the electrode 1 may be sealed by means of a suitable sealant such as a casting resin.

Electrodes in accordance with the present invention may be advantageously manufactured in accordance with the teachings of the co-pending application of J. C. Duddy, Serial No. 33,942, filed June 6, 1960, now abandoned, and entitled "Method of Manufacturing Electrodes," and assigned to the assignee of the present invention. In this application there is described a method of making electrodes which is characterized by the utilization of two intimately mixed incompatible thermoplastic resins, one of which is soluble in a solvent in which the other is insoluble, as a temporary binder for powdered metal electrodes to be structuralized by subsequent sintering. The soluble thermoplastic resin is removed after the shaping of the electrode, but prior to sintering thereof to leave the electrode to be sintered porous. In this manner there is provided uniformly distributed pores in the electrode for the escape of the gaseous products produced by the thermal decomposition of the other thermoplastic resin during sintering. By utilizing a temporary thermoplastic binding matrix for the electrode material to be sintered, electrodes can be extruded in a more or less continuous process.

By way of specific example, an electrode shown in FIG. 1 having 26 parallel gas passages was extruded by first plasticizing under heat and pressure one part by weight of polyethylene and 0.85 part by weight of polyethylene oxide. These resins were plasticized and intimately mixed on an intensive mixer, specifically a two-roll rubber mill in which the rollers were operated at differential speeds. A temperature of about 275° F. was found to be applicable for plasticizing these two resins. After the plasticization and admixing of the two resins was completed, there was added to the plasticized mass 13 parts by weight of finely divided silver powder and 2.1 parts by weight of finely divided nickel powder. After a time interval adequate for the thorough and intimate mixing of these metal powders into the thermoplastic resin the mixture was removed from the mill and pelletized at room temperature for subsequent shaping into electrodes by means of an extruder.

Next, the pelletized mixture of thermoplastic resin and powdered metal is fed to an extruder to produce electrodes of the type illustrated in the drawings. For this purpose a temperature of about 180° F. at the cylinder end of the extruder was found to be suitable and a head temperature of 220° F. has been found applicable for extruder operation where electrodes having a gas passage of $\frac{1}{16}''$ in diameter and a wall thickness of $\frac{1}{32}''$ are being produced at a speed of about 5 feet per minute. For some fuel cell applications, it has been found desirable in order to provide for maximum consolidation of the shaped material to extrude the electrodes at least twice. This is accomplished by re-grinding the electrodes first produced and re-extruding the material. The corrugated electrodes thus produced may be taken from the extruder on a belt-type conveyor and subsequently cut to the desired length.

Following the shaping of the electrode material, the soluble resin phase, the polyethylene oxide, is then leached from the electrode by soaking it in a water bath. Preferred method of leaching the polyethylene oxide from the electrodes thus produced is to suspend it vertically in a suitable container and to continuously feed fresh water into the container at the top, while drawing off a similar quantity from the bottom. The leaching operation is considered to be complete when a sample of the leach water exhibits no froth upon vigorous shaking. Any residual leach water may be removed from the electrodes by allowing them to stand at room temperature or they may be dried in a circulating air oven at a temperature below 180° F. It should be understood that at this stage of electrode production the powdered metals are homogeneously dispersed through a porous matrix of the polyethylene. In this respect the removal of polyethylene oxide provides escape passages for the nondistruptive removal during the subsequent sintering operation of the poducts of combustion of the polyethylene producing stronger, more uniform electrodes.

Following the drying of the electrode the powdered metals therein are structuralized by sintering during which time the polyethylene is removed by combustion. In this respect it has been found desirable to start the sintering operation at room temperature, continuously increasing it over a 24-hour period to a maximum temperature in the range of from 450° F. to 600° F. In this manner, the lower molecular weight fractions or highly volatile portions of the polyethylene are removed first with the less volatile portions being subsequently removed as the temperature is further increased. Simultaneously, the sintering of the metal particles proceeds gradually with electrode strength increasing progressively.

It should be understood, however, that the method of producing electrodes described does not constitute in any manner a part of the present invention and the foregoing example has been given by way of illustration only of one method by which electrodes in accordance with the present invention may be made. It also should be understood that the particular metals utilized in the example hereinbefore, are illustrative only of a mixture of two catalytically active fuel cell metals which may be employed to produce sintered electrodes. The present invention is fully applicable to all sinterable metals which are catalytically active for fuel cell electrode purposes and is directed toward the configuration of the porous sintered body and not to the material therein or its method of manufacture. From the foregoing, it can be seen that the corrugated electrode surface together with the parallel gas channels centrally disposed between these electrode surfaces provide an electrode which is designed to have uniform gas diffusion paths throughout without a loss of electrode strength.

Having described the invention that which is claimed as new is:

1. A plate type gas electrode for fuel cells which comprises a porous, sintered body of catalytically active powdered metal having a pair of oppositely disposed electrochemically active surfaces and two oppositely disposed electrochemically active sides, a plurality of parallel gas channels extending from one end of said electrode to the other, gas manifolding means interconnecting said gas channels at least at one end of said electrode, said oppositely disposed electrochemically active surfaces being corrugated to conform to the geometric configuration of said gas channels so as to provide a uniformly, substantially equal wall thickness between said electrochemically active surfaces and sides and the interior electrode surface comprising said gas channels, whereby said gas electrode is characterized by substantially uniform and equal current density across its electrochemically active surfaces and sides.

2. An electrode in accordance with claim 1 wherein said gas channels have circular cross-sections and said corrugations are concentric thereto.

3. An electrode in accordance with claim 1 wherein said gas passages have square cross-sections and said corrugations are triangular to conform thereto.

4. An electrode in accordance with claim 1 where the end of said electrode opposite said manifolding means is sealed.

5. An electrode in accordance with claim 1 wherein a second manifolding means interconnects said gas channels at the other end of said electrode from said one end.

6. In a fuel cell for the direct production of electrical energy from gases by means of electrodes disposed in an electrolyte, the improvement which comprises at least one of said electrodes being a plate type gas electrode having a pair of oppositely disposed electrochemically active surfaces and two oppositely disposed electrochemically active sides, a plurality of substantially parallel gas channels having circular cross-sections centrally disposed between said electrochemically active surfaces and sides, said gas channels extending from one end of said electrode to the other and substantially equally spaced from each other, gas manifolding means interconecting said gas channels at one end of said electrode for feeding gas to said gas channels, said electrochemically active surfaces being corrugated to conform to the circular cross-section of said gas channels, thereby providing an electrode with a uniformly, substantially equal wall thickness between said electrochemically active surfaces and sides in contact with said electrolyte and the interior electrode surface comprising said gas channels and in contact with said gas.

References Cited by the Examiner

UNITED STATES PATENTS

| | | | |
|---|---|---|---|
| 655,110 | 7/1900 | Pleacher | 136—86 |
| 757,637 | 4/1904 | Reid | 136—86.1 |
| 2,716,670 | 8/1955 | Bacon | 136—86 |
| 2,860,175 | 11/1958 | Justi | 136—120 |
| 3,101,285 | 8/1963 | Tantram et al. | 136—120 |

FOREIGN PATENTS 126,921  7/1959  Russia.

JOHN H. MACK, *Primary Examiner.*

JOHN R. SPECK, *Examiner.*

W. VAN SISE, *Assistant Examiner.*